United States Patent [19]

Goel

[11] Patent Number: 4,683,284

[45] Date of Patent: Jul. 28, 1987

[54] OXIME CARBAMATE ACCELERATORS FOR CURING POLYEPOXIDES

[75] Inventor: Anil B. Goel, Worthington, Ohio

[73] Assignee: Ashland Oil, Inc., Ashland, Ky.

[21] Appl. No.: 877,622

[22] Filed: Jun. 23, 1986

[51] Int. Cl.⁴ .................. C08G 59/68; C08G 59/56
[52] U.S. Cl. .................................. 528/93; 528/120; 528/361; 528/365; 528/369
[58] Field of Search ................ 528/93, 120, 361, 369, 528/365, 73

[56] References Cited

U.S. PATENT DOCUMENTS

| | | | |
|---|---|---|---|
| 3,703,497 | 11/1972 | Carlos et al. ............... | 528/93 X |
| 4,122,068 | 10/1978 | Meyer ..................... | 528/370 X |
| 4,122,069 | 10/1978 | Meyer ..................... | 528/94 X |
| 4,528,363 | 7/1985 | Tominaga ................. | 528/370 |
| 4,588,783 | 5/1986 | Chang ..................... | 528/367 X |

*Primary Examiner*—Earl Nielsen
*Attorney, Agent, or Firm*—John F. Jones

[57] ABSTRACT

A mixture of an adhesive composition comprising (A) an epoxy resin and an oxime carbamate and (B) an amine hardener containing primary, secondary or tertiary amino or amido-amine groups and its process for curing said adhesive are described.

18 Claims, No Drawings

OXIME CARBAMATE ACCELERATORS FOR CURING POLYEPOXIDES

This invention relates to a process for curing epoxide resins with conventional curing agents in which an oxime carbamate is included as a cure accelerator.

Many curing agents are known for epoxy resins including amines, anhydrides of carboxylic acids, mercaptans, and others which have been described in the prior art. Each type of curing agent has been found to have advantages and disadvantages which makes it either suitable or unsuitable for any given application in which epoxy resins are used and cured. It is also known to use combinations of the various curing agents as accelerators for some purposes. Accelerators are known for enhancing the curing rate of epoxide resins in the presence of the conventional curing agents. Prior art accelerators include inorganic and organic metal salts such as lithium chloride and stannous octoate; onium salts such as ammonium chloride, alkyl phosphonium halides, etc. and boron trifluoride complexes.

There is a need to develop curable epoxy resin compositions which cure very rapidly at moderately elevated temperatures and have very long open time (pot life) at room temperatures in applications such as structural adhesives, coatings and sheet molding compound (SMC).

I have discovered that oxime charbamates, which can be derived from the reaction of an oxime with a mono- or polyisocyanate, function as latent accelerators in the curing of polyepoxides with conventional curing agents. The mixtures of an epoxide, conventional curing agen and oxime carbamate in accordance with this invention have relatively long pot life at about room temperature but cure very rapidly at moderately elevated temperatures.

The use of the conventional accelerators which were mentioned above results either in reduction of pot life (open time) of the epoxide mixture at room temperature or requires much elevated temperatures or longer times at lower temperatures before the acceleration effect occurs.

The use of certain oxime carbamates obtainable from the reactions of oximes (mono- and di-oximes) with mono- and poly-isocyanates in the epoxy resin compositions comprising an epoxy resin and an amine hardener, provides the desired latent acceleration which has been sought in the art. Thus, heat-curable compositions exhibiting improved thermal latency are obtained from epoxy compositions comprising (1) a polyepoxide, (2) an amine hardener containing primary, secondary and tertiary amino and amido-amine groups and (3) an oxime carbamate.

The oxime carbamates (blocked isocyanates) which show the latent acceleration include the reaction products of mono- and dioximes with aliphatic, or aromatic mono- and polyisocyanates and contain one or more of the functional groups

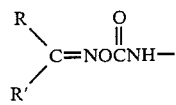

wherein R and R' independently represent hydrogen, an alkyl group having from 1 to 20 carbon atoms, an aryl group having from 6 to 12 carbon atoms or an alkaryl group having from 7 to 20 carbon atoms.

The polyepoxides or epoxy resins useful in this invention can be monomeric or polymeric, saturated or unsaturated, aliphatic, cycloaliphatic, aromatic or heterocyclic and they may be substituted if desired with other substituents besides the epoxy groups, e.g. hydroxyl groups, ether radicals, halogen atoms and the like. Typical epoxy components suitable in the practice of this invention include those disclosed in U.S. Pat. Nos. 2,500,600 and 2,324,483 which are incorporated here by reference. Preferred in this invention are 1,2-epoxy compounds having an epoxide equivalence greater than 1, that is to say, compounds containing more than one group of the formula

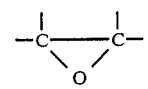

The 1,2-epoxide groups may be either terminal or inner ones. Particularly suitable terminal 1,2-epoxy groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate, or the dimethyl ester of 6,7,10,11-diepoxyhexadecane-1,16-dicarboxylic acid. Furthermore, there may be mentioned epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The oxime carbamates embodied in this invention may conveniently be used either by dissolving, blending, or suspending them in the epoxy component usually in a two component epoxy composition (One component contains the epoxy resin and the other component contains the hardener or curing agent. The two components are usually stored separately and mixed a short time before curing is done.) and may be used in amounts ranging from about 0.2 to about 20% by weight based on the weight of the epoxide resin. Additives and diluents such as butadiene/acryionitrile rubber, monoepoxides, lactones and organic carbonates may also be included in the epoxy component. The hardener component (curing agent) may be composed of curing agents such as primary, secondary aliphatic or aromatic amines and tertiary amines, phenolics and optionally, free oximes and other epoxy curing catalysts and promoters. Suitable amine curing agents include aliphatic or aromatic amines and short or long chain amines with hydrocarbon, alkylene ether, etc. groups in the chain. It has been found that the best latent acceleration can be obtained when a mixture of a low molecular weight amine, such as amino ethyl piperazine along with higher molecular weight amines, or amido-amines such as poly (propylene oxide) di or tri amine. A wide ratio of epoxide resin to amine hardener may be used and specific ratios depend upon the particular application and type of product desired. The epoxy hardener component may be filled with fillers, pigments, metals and metal oxides for induction curing, etc. as is well known in the art. The curing may be carried out in the temperature range of from about ambient to about 200° C. and preferably from about 60° C. to about 160° C.

The compositions and process of this invention may be used in many applications such as for coatings, adhesives for metals, SMC, reinforced plastics, cement and the like, and in the preparation of reinforced composite products such as laminated products, filament windings, molding powders, potting compounds and the like.

This invention is further illustrated in the following representative examples.

EXAMPLE 1

To 7.3 g of acetone oxime dissolved in 50 g of toluene was added 0.03 g of dibutyltin dilaurate (DBTDL) followed by dropwise addition of 14.5 g of liquid methylene bis (phenyl isocyanate) (NCO equivalent weight of 144). The reaction mixture was stirred at room temperature under nitrogen, an exothermic reaction occurred and an oily material phased out. The addition of pentane to the mixture caused a white solid formation. The supernatant liquid was then decanted from the mixture and the solid was washed with pentane and dried under reduced pressure. This oxime carbamate product was designated accelerator "A".

EXAMPLE 2

The procedure of Example 1 was followed using 7.7 g of acetone oxime. 9 g of hexamethylene diisocyanate and 0.03 g of dibutyltin dilaurate. The product obtained was designated accelerator "B".

EXAMPLE 3

The procedure 1 was followed using 7.3 g of acetone oxime, 8.7 g of toluene diisocyanate, and 0.03 g of DBTDL. The oxime carbamate was designated accelerator "C".

EXAMPLE 4

To 5.8 g of dimethyl glyoxime suspended in 50 m. of toluene and 5 ml of acetone was added 0.03 g of DBTDL followed by 12 g of phenyl isocyanate. The mixture was heated at approximately 50° C. while the mixture was stirred continuously. A clear solution formed within five minutes which, upon further stirring, resulted in white crystalline solid precipitation. The reaction was continued for about 5 hours and the solid was removed by filtration and was washed with hexane. The dried solid carbamate was designated accelerator "D".

EXAMPLES 5–13

Several batches of liquid diglycidyl ether of Bisphenol-A resins (epoxy equivalent weight of 180–190) were prepared by blending with the different oxime carbamate accelerators described in the preceding examples. The resins were mixed with amine hardeners and the room temperature open time (pot life) and moderately elevated temperature gel time (time required for infusible product to form) were determined. In all cases the pot life was greater than 5 hours. The results of these experiments are given in the Table which clearly demonstrates latent aceleration caused by inclusion of the oxime carbamates of the present invention. Examples 5 and 9 shown in the Table are given for comparative purposes and are outside the scope of this invention.

TABLE

| Example | Epoxy Resin (g) | Accelerator (g) | Hardener (g) | Cure Temp. °C. | Gel Time (Min) |
|---|---|---|---|---|---|
| 5 | 10 | — | *D 400 (5) **AEP (1) | 105 | 5.5 |
| 6 | 10 | A (0.3) | D 400 (5) AEP (1) | 105 | 3.7 |
| 7 | 10 | A (0.3) | D 400 (5) AEP (1) | 100 | 4 |
| 8 | 10 | A (0.35) | D 400 (5) AEP (1) | 105 | 3.5 |
| 9 | 5 | — | D 400 (2.1) AEP (0.4) | 84 | 28 |
| 10 | 5 | A (0.2) | D 400 (2.1) AEP (0.4) | 84 | 13 |
| 11 | 10 | B (0.3) | D 400 (5) AEP (1) | 105 | 3.7 |
| 12 | 10 | C (0.3) | D 400 (5) AEP (1) | 105 | 3.5 |
| 13 | 5 | D (0.3) | D 400 (2.1) AEP (0.4) | 105 | 3 |

*D 400 is 400 molecular weight poly(propylene oxide) diprimary amine from Texaco Chemical Co.
**AEP is amino ethyl piperazine

I claim:

1. The adhesive composition comprising a mixture of
(A) An epoxy resin and an oxime carbamate and
(B) An amine hardener containing primary, secondary or tertiary amino or amido-amine groups.

2. The composition of claim 1 wherein the epoxy resin is one containing more than one group of the formula.

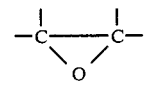

3. The composition of claim 2 wherein the oxime carbamate is a compound having one or more of the functional groups

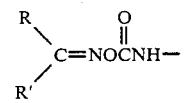

wherein R and R' and independently represent hydrogen, an alkyl group having 1 to 20 carbon atoms, an aryl group having from 6 to 12 carbon atoms or an alkaryl group having from 7 to 20 carbon atoms.

4. The composition of claim 3 wherein the oxime carbamate in (A) is present in from about 0.2% to 20% by weight based on the weight of the epoxide resin.

5. The composition of claim 4 wherein the carbamate is the reaction product of acetone oxime and methlene bis(phenyl isocyanate).

6. The composition of claim 4 wherein the carbamate is the reaction product of acetone oxime and hexamethylene diisocyanate.

7. The composition of claim 4 wherein the carbamate is the reaction product of acetone oxime and toluene diisocyanate.

8. The composition of claim 4 wherein the carbamate is the reaction product of dimethyl glyoxime and phenyl isocyanate.

9. The composition of claim 5 wherein the epoxy resin is a diglycidyl ether of Bisphenol-A.

10. The composition of claim 6 wherein the epoxy resin is a diglycidyl ether of Bisphenol-A.

11. The composition of claim 7 wherein the epoxy resin is a diglycidyl ether of Bisphenol-A.

12. The composition of claim 8 wherein the epoxy resin is a diglycidyl ether of Bisphenol-A.

13. The process comprising mixing
(A) An epoxy resin and an oxime carbamate with
(B) An amine hardener containing primary, secondary or tertiary amino or amido-amine groups, applying said mixture to at least one substrate and curing said mixture at a temperature in the range of from about ambient to about 200° C.

14. The process of claim 13 wherein the oxime carbamate is a compound having one or more of the functional groups

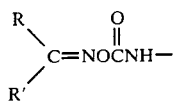

wherein R and R' independently represent hydrogen, an alkyl group having from 1 to 20 carbon atoms, an aryl group having from 6 to 20 carbon atoms or an alkaryl group having from 7 to 20 carbon atoms.

15. The process of claim 14 wherein the carbamate is the reaction product of acetone oxime and methylene bis(phenyl isocyanate).

16. The process of claim 14 wherein the carbamate is the reaction product or acetone oxime and hexamethylene diisocyanate.

17. The process of claim 14 wherein the carbamate is the reaction product of acetone oxime and toluene diisocyanate.

18. The process of claim 14 wherein the carbamate is the reaction product of dimethyl glyoxime and phenyl isocyanate.

* * * * *